(No Model.)
F. LATIMER.
VEHICLE TIRE.
No. 602,759.  Patented Apr. 19, 1898.
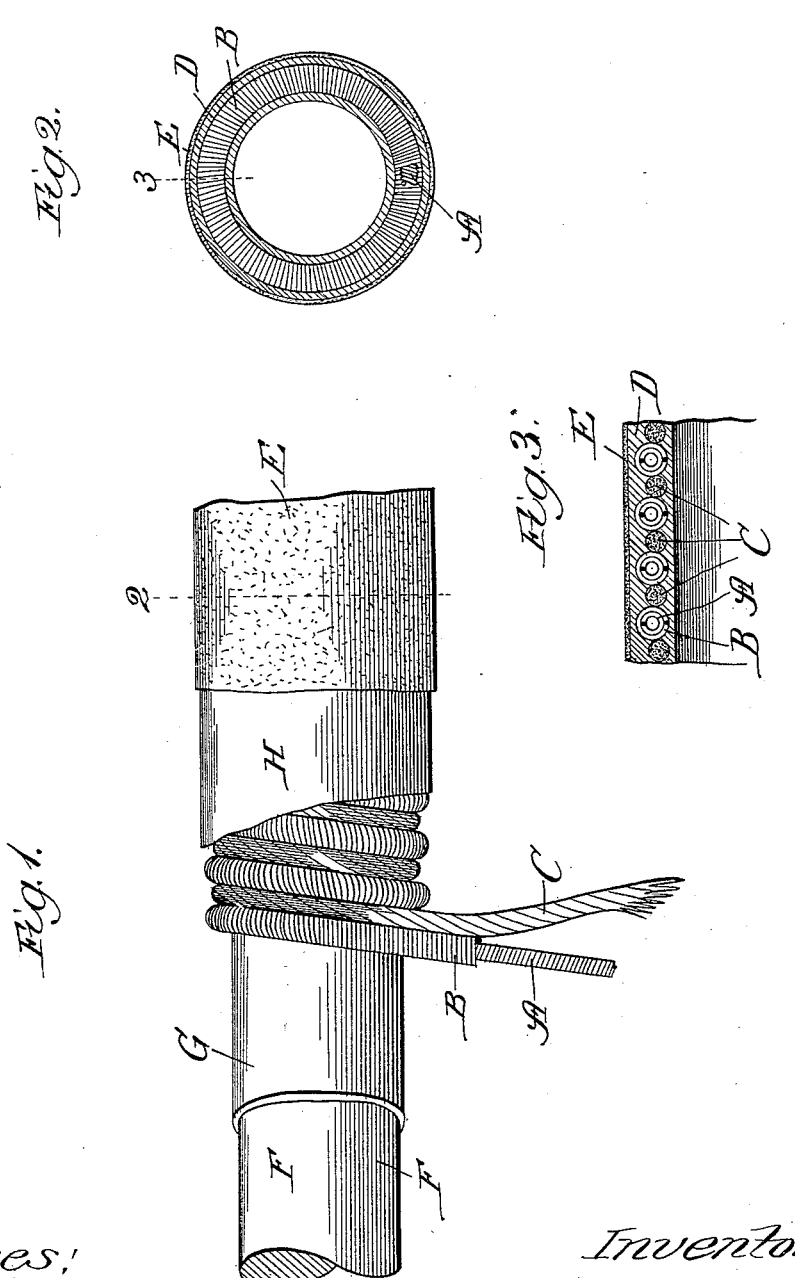
Witnesses:
Inventor:
Frank Latimer,
THE NORRIS PETERS CO., PHOTO-LITHO., WASHINGTON, D. C.

UNITED STATES PATENT OFFICE.

FRANK LATIMER, OF HUNTLEY, ILLINOIS.

VEHICLE-TIRE.

SPECIFICATION forming part of Letters Patent No. 602,759, dated April 19, 1898.

Application filed November 4, 1897. Serial No. 657,315. (No model.)

*To all whom it may concern:*

Be it known that I, FRANK LATIMER, a citizen of the United States, residing at Huntley, McHenry county, Illinois, have invented certain new and useful Improvements in Tires for Vehicles, of which the following is a specification.

The object of my invention is to provide a simple, economical, and efficient tire; and the invention consists in the features, combinations, and details of construction hereinafter described and claimed.

In the art to which this invention relates it is well known that ordinary pneumatic tires as adapted for use in connection with vehicle-wheels are liable to become punctured and that when punctured they become deflated and unfit for use, sometimes to such an extent that they have to be discarded entirely or sent to the factory for repairing and revulcanizing.

The principal object of my invention, therefore, is to remove the above objection and to provide a tire which may be used with or without an auxiliary air-cushion.

In the accompanying drawings, Figure 1 is an elevation of a portion of a tire constructed in accordance with my improvements, broken away and showing the method of winding, the process of construction, and the mandrel upon which the tire is formed; Fig. 2, a transverse sectional view of the tire, taken on line 2 of Fig. 1; and Fig. 3, a longitudinal sectional view of a portion of the tire, taken on line 3 of Fig. 2.

In constructing a tire in accordance with my improvements I prefer to use two coils of wire that are wound primarily as shown at A and B of Fig. 1. These coils are preferably wound in the opposite direction, the one of smaller diameter being inserted in the one of larger diameter, forming, as it were, a tubular engagement, and they may be of the same gage of wire or of different gages and of any desired diameter in order to produce the desired resiliency. These coils are wound in a compound manner, the coils of the compound helix being separated from each other preferably by means of a linen cord C and coated inside and outside or embedded in a body of tacky rubber D, so as to form a tube, which may or may not be provided with an outer casing E, formed of the usual fabric which goes to make a portion of ordinary tires, the whole being vulcanized together, so as to make a complete tubular annulus.

As one method of producing my tire I provide a mandrel F of the desired diameter and length and cover it with a coating of tacky rubber G. I then take the primary coils of wire and insert the small coil in the larger coil in a telescopic or tubular manner and wind it on the coating of tacky rubber on the mandrel, separating the coils of this helix by means of the cord C. I then cover the coils of wire and cord with a second outer coating of rubber H. The outer casing E is then placed around the entire tube and such tube withdrawn from the mandrel. The ends of the tube are then united and the whole vulcanized in any of the usual manners.

While I have described my invention with more or less minuteness as regards details, yet I do not desire to be limited thereto unduly any more than is pointed out in the claims. On the contrary, I contemplate the omission of various parts and substitution of equivalents as circumstances may suggest or necessity render expedient.

I claim—

1. In a vehicle-tire, a compound coil of wire formed of two primary coils in telescopic or tubular engagement with each other and wound around in the tire so as to form a compound helix, substantially as described.

2. In a vehicle-tire, the combination of a compound helix formed of two primary coils of wire in telescopic or tubular engagement with each other, a cord wound around between the coils of the compound helix so as to keep such coils out of physical contact with each other, substantially as described.

3. In a vehicle-tire, the combination of a compound helix formed of at least two primary coils of wire in telescopic or tubular engagement with each other, a cord wound around in a helical manner between the coils of the compound helix to keep such coils out of physical contact, and a body of rubber in which such coils are embedded or vulcanized so as to produce the complete tire and hold the parts in position, substantially as described.

FRANK LATIMER.

Witnesses:
  THOMAS F. SHERIDAN,
  THOMAS B. MCGREGOR.